United States Patent
Levander et al.

(12)
(10) Patent No.: US 6,790,496 B1
(45) Date of Patent: Sep. 14, 2004

(54) MATERIALS FOR PACKING NICOTINE-CONTAINING PRODUCTS

(75) Inventors: Gustav Levander, Tullinge (SE); Anders H. F. Karlsson, Malmo (SE); Ingemar Hildingsson, Lund (SE)

(73) Assignee: Pfizer Health AB, Stockholm (SE)

( * ) Notice: Subject to any disclaimer, the term of this patent is extended or adjusted under 35 U.S.C. 154(b) by 0 days.

(21) Appl. No.: 09/889,772

(22) PCT Filed: Jan. 12, 2000

(86) PCT No.: PCT/SE00/00017
§ 371 (c)(1), (2), (4) Date: Oct. 17, 2001

(87) PCT Pub. No.: WO00/44559
PCT Pub. Date: Aug. 3, 2000

(30) Foreign Application Priority Data

Jan. 26, 1999 (SE) ............................................... 9900215

(51) Int. Cl.[7] ............................ A61F 13/00; A61K 9/70
(52) U.S. Cl. .................... 428/35.7; 428/35.8; 428/36.6; 428/36.7
(58) Field of Search ............................... 428/35.7, 35.8, 428/36.6, 36.7

(56) References Cited

U.S. PATENT DOCUMENTS

| | | | | |
|---|---|---|---|---|
| 5,225,199 A | | 7/1993 | Hidaka et al. | 424/443 |
| 5,326,848 A | | 7/1994 | Kashimura et al. | 528/190 |
| 5,804,215 A | * | 9/1998 | Cubbage et al. | 424/449 |
| 6,037,033 A | * | 3/2000 | Hunter | 428/72 |
| 6,162,516 A | * | 12/2000 | Derr | 428/35.2 |
| 6,241,349 B1 | * | 6/2001 | Harvey et al. | 347/86 |

FOREIGN PATENT DOCUMENTS

| | | |
|---|---|---|
| EP | 0 656 389 B1 | 10/2001 |
| JP | 04239607 A * | 8/1992 |
| WO | 91/09731 A1 | 7/1991 |

* cited by examiner

Primary Examiner—Sandra M. Nolan
(74) Attorney, Agent, or Firm—Fulbright & Jaworski, LLP

(57) ABSTRACT

A material for packaging a nicotine product comprising a polymer based on dimethyl-2,6-naphthalene dicarboxylic or 2,6-naphthalene dicarboxylic acid monomers, such as polyethylene naphtalate (PEN) or polytrimethylene naphtalate (PTN), or a liquid crystal polymer (LPC). The material may be laminated to another polymer or to metal foil.

33 Claims, No Drawings

MATERIALS FOR PACKING NICOTINE-CONTAINING PRODUCTS

This application is a U.S. National Stage of International Application No. PCT/SE00/00017, which was filed on Jan. 12, 2000 and claims priority to Swedish Application No. 9900215-6, which was filed on Jan. 26, 1999.

TECHNICAL FIELD

The present invention relates to materials for packaging nicotine-containing products.

BACKGROUND ART

For many years tobacco smoking has been one of the major health problems throughout the world. Smoking is now recognized as the main cause for e.g. high blood pressure and lung cancer. However, because of the addictive nature of nicotine it is utterly difficult for heavy smokers to completely stop smoking. An acceptable alternative to smoking has been to provide nicotine in a form or manner other than by smoking, e.g. as a chewing gum containing nicotine as an active ingredient, see e.g. U.S. Pat. No. 3,845,217. Other products used as substitutes for smoking are tablets containing nicotine, see e.g. U.S. Pat. No. 5,543,424, devices for allowing nicotine to be inhaled through an elongated tube, see e.g. U.S. Pat. No. 5,501,236, nicotine containing nasal sprays, see e.g. U.S. Pat. No. 5,656,255, patches for administering nicotine transdermally, see e.g. U.S. Pat. No. 4,915,950, etc.

The primary requirement when packaging drugs and food is the demand that the package must protect the product against penetration of moisture and oxygen from the environment. Very seldom the product itself constitutes any problems. Nicotine, on the other hand, is very aggressive towards its environment and migrates through most known materials. It is also very hygroscopic and therefore sensitive to moisture and when exposed to oxygen or air the nicotine turns brown. Because of the toxicity of nicotine and because the expected shelf-life for nicotine containing products is as long as up to two years, commonly used materials within the package industry, e.g. polypropylene, polyethylene and polyvinyl chloride therefore cannot be used for nicotine containing products.

A known polymer which fulfills the requirements of oxygen, water and nicotine impermeability is commercially available under the trademark Barex®, being a copolymer made of acrylonitrile and methylmetacrylate and grafted to nitrile rubber on the main chain. Due to the copolymerization with methylmethacrylate the polymer becomes softer and is possible to process. Barex® is available with different amounts of nitrile rubber, is amorphous and is a glass polymer at room temperature.

The temperature range within which Barex® may be processed is, however, very narrow rendering the polymer difficult to process resulting in a large amount of discarded material. This is partly due to Barex® having a temperature dependent elasticity. Today, Barex® is also associated with a high price.

The use of Barex® in a nicotine impermeable container is disclosed in U.S. Pat. No. 5,501,236.

SUMMARY OF THE INVENTION

It is therefore an object of the present invention to provide an alternative material to Barex®, which exhibits favorable characteristics of oxygen, water and nicotine impermeability, but which does not suffer from the above-mentioned drawbacks. According to the invention it is therefore suggested an alternative nicotine impermeable packaging material for a nicotine-containing product having the characterizing features of the claims.

The material of the invention comprises polyethylene naphthalate, polytrimethylene naphthalate and/or a liquid crystal polymer, LCP, and has excellent characteristics of oxygen, water, and nicotine impermeability. Due to the temperature ranges the polymers of the invention are favorable to process and will have an acceptable price. The material of the invention is known per se, but its excellent nicotine barrier properties have not been known. Neither has its use for making packages for nicotine-containing products been contemplated.

DETAILED DESCRIPTION OF THE INVENTION

The packaging material of the invention is intended for use in connection with nicotine containing products for therapeutic treatment of patients having an addiction to nicotine. Examples of such products are chewing gums, sublingual tablets, nasal sprays, nicotine patches and nicotine inhaling devices, all marketed through Pharmacia & Up-john. These products are all classified as drugs and thus, the requirements of product stability are high. The expected shelf life is two years without any noticeable change regarding composition, concentration and dosage. Specific ranges for allowed variations have been established in accordance with requirements from the authorities, e.g. Food and Drug Administration, FDA, in the USA.

In chewing gums the nicotine is usually present in the form of a complex with an insoluble cation-exchanger, which is disbursed in a gum base, in order to be stabilized. In tablets the nicotine is usually present in the form of an inclusion complex. Only small amounts, if any, of nicotine are in contact with the package for chewing gums and tablets and thus, the demand for a nicotine barrier becomes lower for these products. The pH for a chewing gum is usually slightly above 4.

In nasal spray the nicotine is present in a liquid solution having a concentration of approximately 10 mg/ml and a pH of approximately 7. The nasal spray is distributed in glass flasks inert to the aggressiveness of nicotine. However, the nicotine solution also comes into contact with seals and pumping devices made of polymeric material.

In a patch and in an inhaling device primarily nicotine vapor comes into contact with the package. Here the concentration depends on the vapor pressure of the nicotine that varies with temperature. In room temperature the concentration in a patch is approximately 250 mg/ml. In a patch and in an inhaling device the pH is approximately 9–10.

A number of factors are important when materials for nicotine-containing packages are chosen. The nicotine must not migrate through the packaging material and disappear from the system or be accumulated uncontrollably in the packaging material. Also, the nicotine must be protected from oxygen due to the fact that it is easily decomposed in contact with air or oxygen. Products containing nicotine also turns brown or yellow when only small amounts of decomposition products are present resulting in cosmetic drawbacks long before any stability limits have been passed. A good oxygen barrier is therefore of utmost importance.

Besides the above mentioned primary demands on good nicotine resistance and low oxygen permeability, other important factors to take into consideration regarding packaging materials for nicotine-containing products are water and moisture permeation, processability, price and environmental impact.

The water barrier is important especially in the nasal spray where loss of water has large impact on the concentration of the product. Water barrier characteristics are also important in other forms of distribution since water may have an impact on permeation characteristics of the polymer. Great consideration should also be taken to the processability since large-scale industrial production is considered where even small problems may involve large costs.

With the aim to find a packaging material for the packaging of a nicotine-containing product, which fulfiils the above mentioned demands two different types of polymers, were found.

The first of these materials is PEN, polyethylene naphthalate.

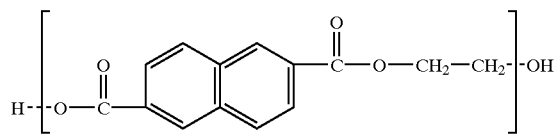

PEN is a polyester based on dimethyl-2,6-naphthalene dicarboxylate or 2,6-naphthalene dicarboxylic acid monomers. Dimethyl-2,6-naphthalene dicarboxylate and -2,6-naphthalene dicarboxylic acid monomers are e.g. sold by Amoco uder the trade name NDC and NDA-monomer respectively. PEN is semicrystallnie and is a glass polymer at room temperature.

There are other polymers such at PTN (polytrimethylene naphthalate) which are based on the same monomers. PTN differs from PEN only in that the ethylene chain has been exchanged to a propylene chain. It is envisageable to use polymers comprising both dimethyl-2,6-naphthalene dicarboxylate or 2,6-naphthalene dicarboxylic acid monomers.

PEN differs from PET (polyethylene tereftalate), which is another, more commonly used polyester, in that the benzene ring in the PET molecule has been exchanged for naphtene in PEN. This makes the PEN structure more rigid than the PET structure and the features of PEN more favorable for this invention than the features of PET.

The second nicotine impermeable polymer of the invention is polyester based Liquid Crystal Polymer, LCP. One example thereof is Vectra® A 530 having the following structure:

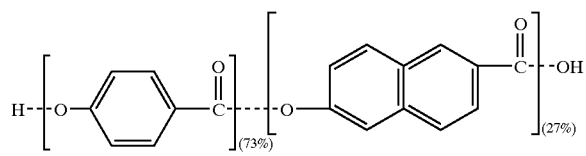

LCPs constitute a group of materials, which have a characteristic molecular structure. LCP polymers consist of rigid rod-like macromolecules that align in the melt to produce a liquid-like structure. This specific structure brings considerable improvement in mechanical properties compared with conventional polymers and a number of other exceptional properties. The monomers are hydroxy benzoic acid and hydroxy naphtenic acid. A typical LCP polymer, such as the above-mentioned Vectra® A 530, is filled with 30% of mineral filler. The LCP material has a dense structure as a consequence of high crystallinity, is chemically resistant and has extremely low diffusion rates for oxygen and water.

According to the invention it was surprisingly found that in addition to the above mentioned barrier properties against water and oxygen PEN, PTN and LCP also exhibit excellent barrier properties against nicotine. In below Table 1 is shown a comparison of the properties of Barex® 210, PEN 14991 and Vectra® A 530. For comparison is added a polymer, Isoplast 2530 (a polyurethane having better barrier characteristics than other polyurethanes due to its high glass transition temperature), which does not have good nicotine impermeability.

Barex® is marketed by British Petroleum, PEN by Shell and by Eastman, Vectra® by Ticona and Isoplast by Dow.

TABLE 1

Material Properties

| Material | Barex 210 | PEN 14991 | Vectra A 530 | Isoplast 2530 |
|---|---|---|---|---|
| Opacity | Transparent | Transparent | Opaque | Transparent |
| Morphology Crystallinity | Amorphous | Semi crystalline | High Crystalline | Amorphous |
| Permeability | | | | |
| Oxygen cm$^3$ · mm/ m$^2$ · day · atm | 0,3 | 1,5 | 0,02 | 2,4 |
| Water g · mm/m$^2$ · day | 2,0 | 0,7 | 0,05 | 1,2 |
| Nicotine Resistance | Excellent | Excellent | Excellent | Not acceptable |
| | | Equivalent to Barex | Equivalent to Barex | Inferior to Barex |
| Processing | | | | |
| Extrusion | + | + | + | + |
| Injection Molding | + | + | + | + |
| Vacuum Forming | + | + | − | |
| Blow Molding | + | + | | + |
| Applications | | | | |
| Film | + | + | + | + |
| Laminate | + | + | + | + |
| Injection Mould details | + | + | + | + |
| Blow Mould details | + | + | | + |
| Blisters | + | + | − | |

The nicotine resistance of the captioned polymer materials was investigated with sorption tests as follows. Pieces of the respective materials were placed in glass bottles containing nicotine solution and were stored therein at room temperature for 1, 2 and 4 weeks. Subsequently the amounts of nicotine sorbed into the respective polymer materials were extracted from the polymers and analyzed by UV, HPLC and GC. The values for Barex 210 were used as reference levels.

As explained above PTN, marketed through Shell, is chemically very similar to PEN. In polymer chemistry it is a commonly accepted principle that close chemical similarity implies similar physical/chemical properties. Hence the above good results for PEN implies that also PTN has good nicotine barrier properties.

The nicotine impermeable polymers PEN and PTN of the invention can be used alone in film applications or may be combined with other barrier materials in a laminate to further improve the barrier characteristics of the packaging material. Suitable materials for laminating are metal, especially aluminium, foils and other polymers, e.g. polyacrylonitrile (PAN), polyamide (PA), polyvinylidene chloride (PVDC), and fluoropolymers, all of which are good oxygen and water barriers. Other polymer materials also suitable are ethylene vinyl alcohol copolymer (EVOH) and polyvinyl alcohol (PVA), which are excellent oxygen barriers, and ionomers (i e ionically crosslinked thermoplastic polymers, whereof Surlyn® from DuPont is an example), polyethylene (PE), and polypropylene (PP), which have good water barrier properties.

LCP is most suitable for use in injection molded applications. PEN, PTN and LCP may be alloyed with other polymers, such as PET. Such an alloy can then be processed as PET, but due to the incorporation of PEN, PTN or an LCP the alloy is conferred superior barrier properties compared to pure PET.

The invention will now be further described and illustrated by reference to the following example. It should be noted that this example should not be construed as limiting the invention in any way.

EXAMPLE 1

An endless sheet of aluminium foil, which optionally on one face is laminated with a thin polymer layer, of e.g. polyethylene or polyethylene terephtalate, is rolled off from a storage roll and passes an applicator which on the other side of the aluminium foil or aluminium foil laminate applies a continues layer of PEN, PTN or an LCP, by means of an extrusion coating device. The thickness of the aluminum foil is within the range of 5–50 µm, preferably within the range of 8–20 µm. The amount of applied polymer may vary, but the thickness thereof is preferably such that a well integrated and substantially intact layer is formed after drying. A suitable thickness range of PEN, PTN or an LCP is 1–100 µm preferably 8–50 µm.

Subsequently patch pouches are manufactured by dividing the laminate into two sheets forming an upper and a lower part of the patch pouch. Subsequently and by means of a vacuum device a nicotine-containing patch is placed on one of the sheets whereupon the other sheet is placed on the patch. Finally the sheets are heat sealed together along their edges to form a pouch.

In Example 1 the nicotine impermeable materials are used to make a package which totally encloses a nicotine-containing product. The present materials are also useful for partially enclosing and/or for sealing a package for a nicotine-containing product. PEN, PTN and LCP, may also be used for all other applications where presently Barex® is used. One such application is the sealing of polymer tubes, containing polymer plugs with nicotine, for the nicotine inhaling device presently marketed by Pharmacia & Up-john and in essence being disclosed in U.S. Pat. No. 5,501,236. Also said polymer tubes may be made of the materials according to the present invention. Such tubes may e.g. be made by injection molding. The materials may also be used in blisters for nicotine chewing gums or tablets and for sealing glass flasks containing nicotine nasal spray.

The materials are suitable for packages wherein dosage forms such as tablets, lozenges or similar are cast directly into the package. Thereby the package is to the extent necessary formed as mould(s) into which is cast the substance to be formed into tablets, lozenges or similar, said material achieving its final shape and form upon solidification in the package. In such package may e g be cast one or more tablets, lozenges etc. After casting the package may be folded or likewise to provide for a nicotine-impermeable package foe the cast tablets, lozenges etc. If necessary the package material may be provided with some added material or thin sheet accounting for that the substance which is cast will not stick to the package material.

What is claimed is:

1. A product comprising a nicotine-containing-product and a material for packaging a nicotine-containing-product, the material comprising a polymer based on dimethyl-2,6 naphthalene dicarboxylate or 2,6-naphthalene dicarboxylic acid monomers, wherein said polymer is a film or laminate and is a barrier against nicotine and oxygen.

2. A product comprising a nicotine-containing-product and a material for packaging a nicotine-containing-product, the material comprising a liquid crystal polymer (LCP), wherein said polymer is a film or laminate and is a barrier against nicotine and oxygen.

3. The product according to claim 1, wherein the polymer is polyethylene naphthalate (PEN).

4. The product according to claim 1, wherein the polymer is polytrimethylene naphthalate (PTN).

5. The product according to claim 2, wherein the LCP comprises hydroxy benzoic acid and hydroxy naphthalenic acid.

6. The product according to claim 1, further comprising other polymer(s), selected from the group consisting of polyacrylonitrile (PAN), polyamide (PA), polyvinylidene chloride (PVDC), fluoropolymers, ethylene vinyl alcohol copolymer (EVOH), polyvinyl alcohol (PVA), ionomers, polyethylene (PE), and polypropylene (PP) and polyethylene terephtalate (PET).

7. The product according to claim 1, wherein the material is laminated with one or more metals or polymer foils.

8. The product according to claim 7, wherein the metal is aluminum foil.

9. A method of packaging a nicotine-containing-product comprising the step of providing a polymer material for a mould or an equivalent to cast the nicotine-containing-product into its final shape upon solidification in the package, wherein the polymer material is based upon dimethyl-2,6 naphthalene dicarboxylate or 2,6-naphthalene dicarboxylic acid monomers, and wherein said polymer is a film or laminate and is a barrier against nicotine and oxygen.

10. The method according to claim 9, wherein the final form of the nicotine-containing-product is a tablet or a lozenge.

11. The material according to claim 1, wherein the nicotine-containing-product is a patch, a chewing gum, a tablet, a lozenge, a spray, or an inhaler.

12. A product comprising a nicotine-containing-product and a material for packaging a nicotine-containing-product, the material comprising a polymer based on a combination of dimethyl-2,6 naphthalene dicarboxylate and 2,6-naphthalene dicarboxylic acid monomers, wherein said polymer is a film or laminate and is a barrier against nicotine and oxygen.

13. The product according to claim 2 further comprising other polymer(s), selected from the group consisting of polyacrylonitrile (PAN), polyamide (PA), polyvinylidene chloride (PVDC), fluoropolymers, ethylene vinyl alcohol copolymer (EVOH), polyvinyl alcohol (PVA), ionomers, polyethylene (PE), and polypropylene (PP) and polyethylene terephtalate (PET).

14. The product according to claim 12 further comprising other polymer(s), selected from the group consisting of polyacrylonitrile (PAN), polyamide (PA), polyvinylidene chloride (PVDC), fluoropolymers, ethylene vinyl alcohol copolymer (EVOH), polyvinyl alcohol (PVA), ionomers, polyethylene (PE), and polypropylene (PP) and polyethylene terephtalate (PET).

15. The product according to claim 12, wherein the nicotine-containing-product is a patch, a chewing gum, a tablet, a lozenge, a spray, or an inhaler.

16. The product according to claim 12, wherein the material is laminated with one or more metals or polymers.

17. The product according to claim 16, wherein the metal is aluminum foil.

18. The product according to claim 2, wherein, the material is laminated with one or more metals or polymers.

19. The product according to claim 18, wherein the metal is aluminum foil.

20. The product according to claim 2, wherein the nicotine-containing-product is a patch, a chewing gum, a tablet, a lozenge, a spray, or an inhaler.

21. A method of packaging a nicotine-containing-product comprising the step of enclosing totally the nicotine-containing-product with a polymer material, wherein the polymer material is a material based on dimethyl-2,6 naphthalene dicarboxylate or 2,6-naphthalene dicarboxylic acid monomers, and wherein said polymer is a film or laminate and is a barrier against nicotine and oxygen.

22. The method according to claim 21, wherein the polymer is polyethylene naphthalate (PEN), polytrimethylene naphthalate (PTN) or a liquid crystal polymer (LCP).

23. The method according to claim 21 further comprising other polymer(s), selected from the group consisting of polyacrylonitrile (PAN), polyamide (PA), polyvinylidene chloride (PVDC), fluoropolymers, ethylene vinyl alcohol copolymer (EVOH), polyvinyl alcohol (PVA), ionomers, polyethylene (PE), and polypropylene (PP) and polyethylene terephtalate (PET).

24. The method according to claim 21, wherein the material is laminated with one or more metals or polymers.

25. The method according to claim 21, wherein the metal is aluminum foil.

26. The method according to claim 21, wherein the nicotine-containing-product is a patch, a chewing gum, a tablet, a lozenge, a spray, or an inhaler.

27. A method of packaging a nicotine-containing-product comprising the step of enclosing partially the nicotine-containing-product with a polymer material, wherein the polymer material is a material based on dimethyl-2,6 naphthalene dicarboxylate or 2,6-naphthalene dicarboxylic acid monomers, and wherein said polymer is a film or laminate and is a barrier against nicotine and oxygen.

28. The method according to claim 27, wherein the polymer is polyethylene naphthalate (PEN), polytrimethylene naphthalate (PTN) or a liquid crystal polymer (LCP).

29. The method according to claim 27, wherein the nicotine-containing-product is a patch, a chewing gum, a tablet, a lozenge, a spray, or an inhaler.

30. A method of packaging a nicotine-containing-product comprising the step of sealing the nicotine-containing-product with a polymer material, wherein the polymer material is a material based on dimethyl-2,6 naphthalene dicarboxylate or 2,6-naphthalene dicarboxylic acid monomers, and wherein said polymer is a film or laminate and is a barrier against nicotine and oxygen.

31. The method according to claim 30, wherein the polymer is polyethylene naphthalate (PEN), polytrimethylene naphthalate (PTN) or a liquid crystal polymer (LCP).

32. The method according to claim 30, wherein the nicotine-containing-product is a patch, a chewing gum, a tablet, a lozenge, a spray, or an inhaler.

33. A material for packaging a nicotine-containing-product comprising a polymer based on dimethyl-2,6 naphthalene dicarboxylate or 2,6-naphthalene dicarboxylic acid monomers, wherein said polymer is polytrimethylene naphthalate (PTN) and is a film or laminate and is a barrier against nicotine and oxygen.

* * * * *